United States Patent
Batur (10) Patent No.: US 8,064,717 B2
(45) Date of Patent: Nov. 22, 2011

(54) DIGITAL CAMERA AND METHOD

(75) Inventor: Aziz Umit Batur, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 885 days.

(21) Appl. No.: 11/553,887

(22) Filed: Oct. 27, 2006

(65) Prior Publication Data
US 2007/0098292 A1 May 3, 2007

Related U.S. Application Data

(60) Provisional application No. 60/730,794, filed on Oct. 28, 2005.

(51) Int. Cl.
*G06K 9/40* (2006.01)
(52) U.S. Cl. .......... 382/275; 382/261; 348/241
(58) Field of Classification Search .......... 382/276, 382/289, 299, 264
See application file for complete search history.

(56) References Cited

U.S. PATENT DOCUMENTS

| | | | |
|---|---|---|---|
| 7,619,656 B2 * | 11/2009 | Ben-Ezra et al. | 348/208.4 |
| 2003/0189655 A1 * | 10/2003 | Lim et al. | 348/241 |
| 2004/0174499 A1 * | 9/2004 | Toshima et al. | 351/239 |

FOREIGN PATENT DOCUMENTS
JP 11284944 A * 10/1999

OTHER PUBLICATIONS

Biemond et al: "Iterative methods for image deblurring", Proc. IEEE, 1990.*
Ogasawara et al: "Image Processing Method and System", JP 11-284944, the english version translated by machine.*

* cited by examiner

*Primary Examiner* — Samir Ahmed
*Assistant Examiner* — Ruiping Li
(74) *Attorney, Agent, or Firm* — Mirna Abyad; Wade J. Brady, III; Frederick J. Telecky, Jr.

(57) ABSTRACT

Deblurring of digital camera images by estimating the blur function from an image extracted from a video sequence taken about the time of an image capture. The extracted image is selected to be the sharpest of the images of the video sequence, and comparison of this sharpest image with the (down-sampled) captured image provides blur function iterative estimation.

5 Claims, 8 Drawing Sheets

DIGITAL CAMERA AND METHOD

CROSS-REFERENCE TO RELATED APPLICATIONS

This application claims priority from provisional application No. 60/730,794, filed Oct. 28, 2005. The following co-assigned copending patent applications disclose related subject matter: application Ser. No.: 11/300,818, filed Dec. 15, 2005 and application Ser. No. 11/383,255, filed May 15, 2006.

BACKGROUND OF THE INVENTION

The present invention relates to digital video signal processing, and more particularly to architectures and methods for digital cameras.

Imaging and video capabilities have become the trend in consumer electronics. Digital cameras, digital camcorders, and video cellular phones are common, and many other new gadgets are evolving in the market. Advances in large resolution CCD/CMOS sensors coupled with the availability of low-power digital signal processors (DSPs) has led to the development of digital cameras with both high resolution image and short audio/visual clip capabilities. The high resolution (e.g., sensor with a 2560×1920 pixel array) provides quality offered by traditional film cameras.

Figure 3A:
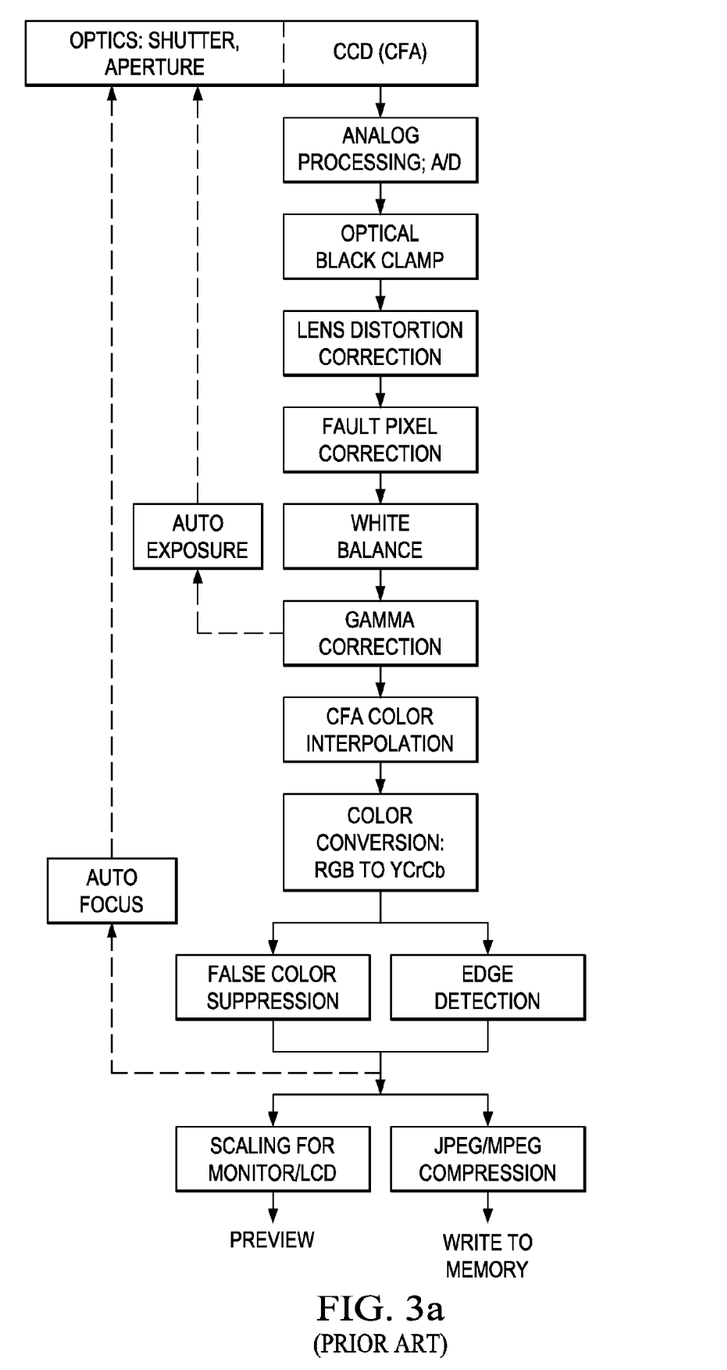
FIGS. 3a-3c illustrate digital camera and network communication.

FIG. 3a is a typical functional block diagram for digital camera control and image processing (the "image pipeline"). The automatic focus, automatic exposure, and automatic white balancing are referred to as the 3A functions; and the image processing includes functions such as color filter array (CFA) interpolation, gamma correction, white balancing, color space conversion, and JPEG/MPEG compression/decompression (JPEG for single images and MPEG for video clips). Note that the typical color CCD consists of a rectangular array of photosites (pixels) with each photosite covered by a filter (the CFA): typically, red, green, or blue. In the commonly-used Bayer pattern CFA one-half of the photosites are green, one-quarter are red, and one-quarter are blue.

Typical digital cameras provide a capture mode with full resolution image or audio/visual clip processing plus compression and storage, a preview mode with lower resolution processing for immediate display of a sequence of images (video clip), and a playback mode for displaying stored images or audio/visual clips.

Images captured by handheld cameras occasionally suffer from image blur when there is not enough light in the scene and/or when high zoom factors are used. This is a significant problem for today's consumer digital cameras and camera phones. A solution for eliminating blur is required to obtain high quality images.

Image deblurring has been an active research area during the last few decades with numerous algorithms published in the literature. For example, M. R. Banham and A. K. Katsaggelos. "Digital Image Restoration," IEEE Signal Processing Magazine, Vol. 14, Issue 2, pp.24-41, March 1997; D. Kundur and D. Hatzinakos. "Blind Image Deconvolution," IEEE Signal Processing Magazine, Vol. 13, Issue 3, pp.43-64, May 1996; and J. Biemond, R. L. Lagendijk, and R. M. Mersereau. "Iterative Methods of Image Deblurring," Proc. of IEEE, Vol. 78, Issue 5, pp. 856-883, May 1990.

Classical image deblurring algorithms require the knowledge of the blur function. The blur function is used to design a filter that removes the blur from the image. There have been several published algorithms that address the problem of estimating the blur function. They mostly involve assuming a parametric form for the blur and then estimating its parameters from the image. For example, J. Biemond, R. L. Lagendijk, and R. M. Mersereau. "Iterative Methods of Image Deblurring," Proc. of IEEE, Vol. 78, Issue 5, pp. 856-883, May 1990; and M. M Chang, A. M. Tekalp, and A. T. Erdem. "Blur Identification Using the Bispectrum," IEEE Trans. Signal Processing, Vol. 39, Issue 10, pp. 2323-2325, Oct. 1991.

The deblurring model using the blur function presumes the blurred pixel at (m,n), denoted $p_B(m,n)$, is given by a two-dimensional convolution of the unblurred image p(m, n) with the blurred image of a single point source; that is, convolution with the point spread function (PSF) or blur function. Denoting the blur function by h(m,n):

$$p_B(m,n) = \int_{support\ of\ h} p(m-j, n-k) h(j,k)\, dj\, dk$$

where integration over the blur function variables is interpreted as interpolated summations for sub-pixel values. Then transforming (2-D DFT) to the frequency domain formally gives a deconvolution:

$$P(j,k) = P_B(j,k)/H(j,k)$$

where P(j,k) is the 2-D DFT transform of p(m,n), $P_B$(j,k) is the 2-D DFT transform of $p_B$(m,n), and H(j,k) is the 2-D DFT transform of h(m,n). However, this raises division by 0 problems, so a regularization term α would typically be included, such as in a constrained least squares approach:

$$P(j,k) = P_B(j,k)\, H(j,k)^* / (|H(j,k)|^2 + \alpha)$$

A final inverse transform (2-D IDFT) recovers the deblurred image.

An example of a typical parametric blur function comes from a linear blur presumption. A motion vector (Vx, Vy) is estimated, and the blurred pixels are a simple averaging along the motion path such as:

$$p_B(m,n) = \int_{0<t<1} p(m-tNVx, n-tNVy)\, dt$$

where the common motion vector has been scaled to the time interval of the image capture (and blur motion). Of course, this is just a two-dimensional convolution of the unblurred image p(m, n) with the following blur function:

$$h(m,n) = \int_{0<t<1} \delta(m-tNVx)\, \delta(n-tNVy)\, dt$$

which would be interpreted in terms of interpolations for the non-integer pixel locations and Kronecker deltas for the Dirac deltas.

Figure 2A:
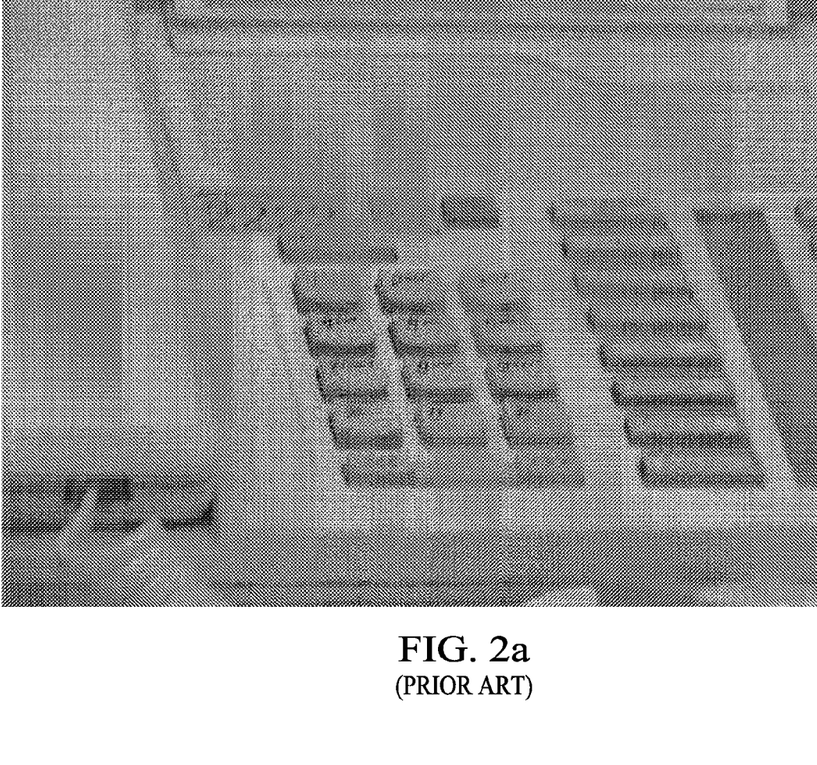
FIGS. 2a-2c show image deblurrings.
Figure 2B:
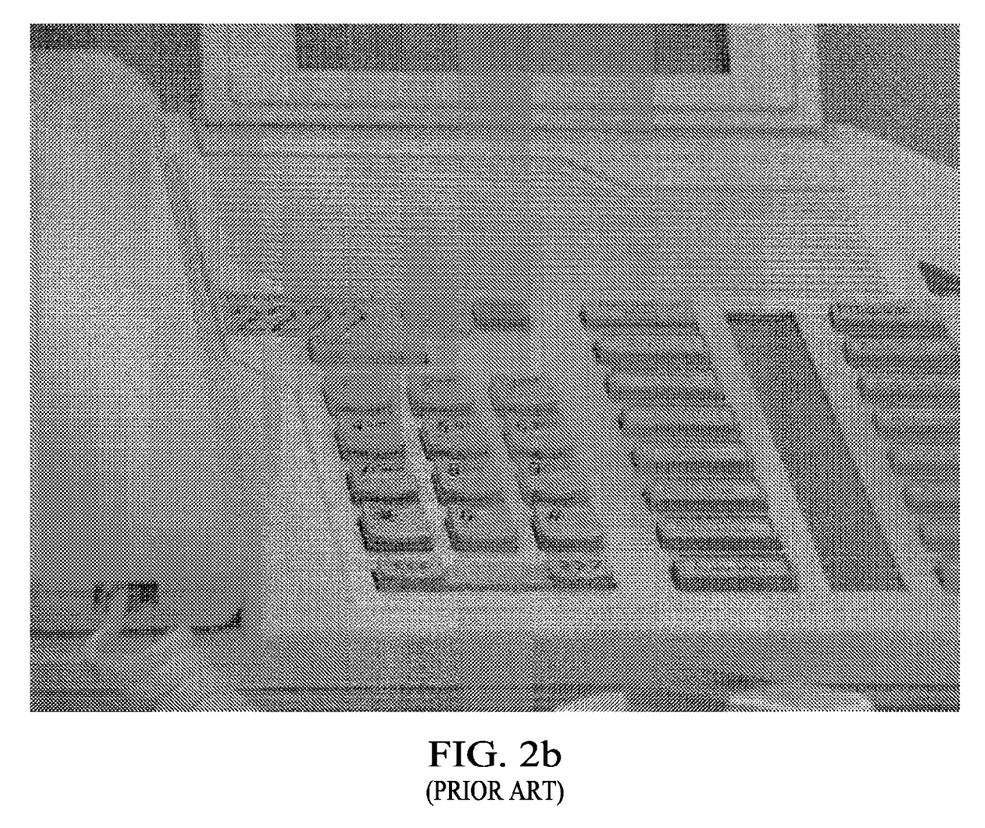

For the handheld camera motion blur case, a typical assumption is to use the linear blur function and estimate two parameters: length and direction of the motion vector. These parameters are estimated from the log power spectrum of the image by locating the minimum points, which are assumed to correspond to the zeros of the blur transfer function. Unfortunately, this approach does not provide an accurate estimate of the blur because hand motion is not really on a linear path. The mismatch between the actual motion and the linear motion model creates numerous artifacts in the deblurred image. FIGS. 2a-2b show deblurring an image using a linear blur function estimate. Note that there are significant artifacts in the deblurred image shown in FIG. 2b. Such a result is not acceptable for consumer quality products.

SUMMARY OF THE INVENTION

The present invention provides deblurring a blurred image with a blur function estimated using a selected image from a sequence of images captured about the blurred image.

DESCRIPTION OF THE PREFERRED EMBODIMENTS

1. Overview

Figure 1A:
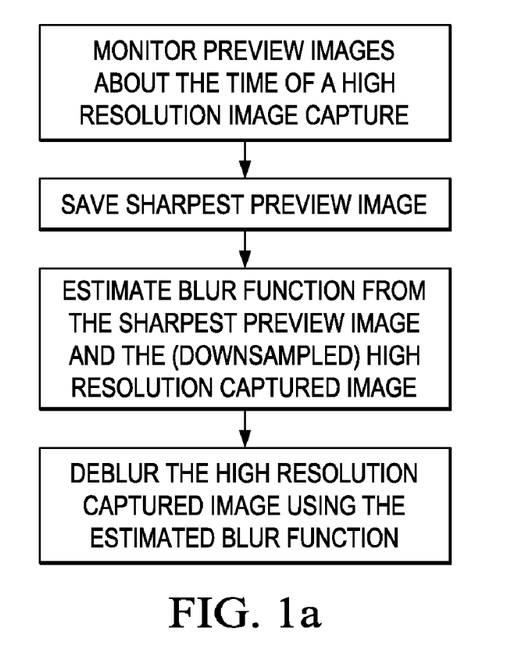
FIGS. 1a-1b are a flowchart and blur function example.
Figure 1B:
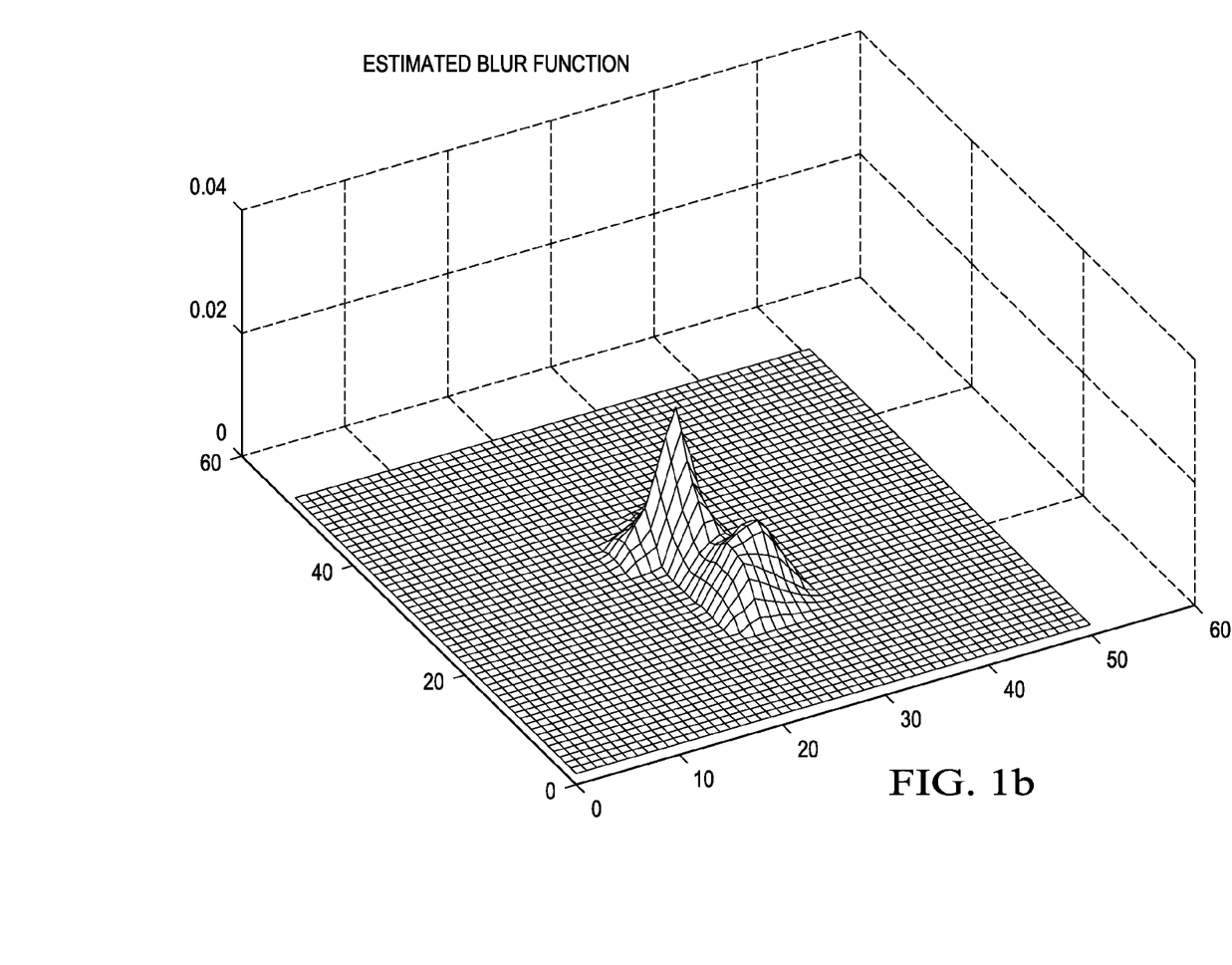

Preferred embodiments provide deblurring methods for digital camera images by selecting the sharpest image from a sequence of images captured about the capture of a blurred image (e.g., images from a preview module in a digital camera), and estimating the blur function from the selected image and a down-sampled version of the blurred image. FIG. 1a is a flowchart and FIG. 1b illustrates a typical estimated blur function. The blur function estimation is non-parametric.

Figure 3B:
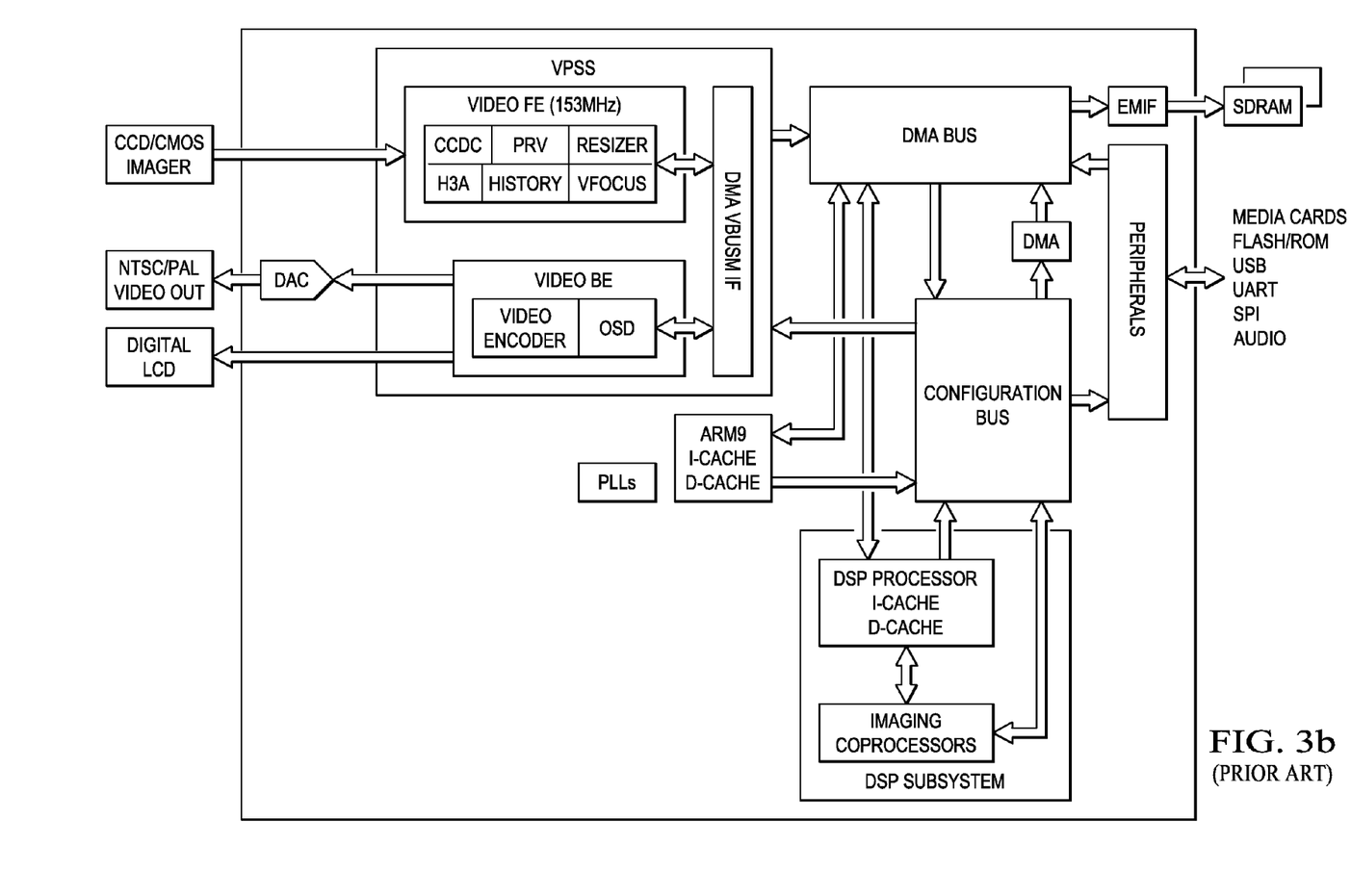
Figure 3C:
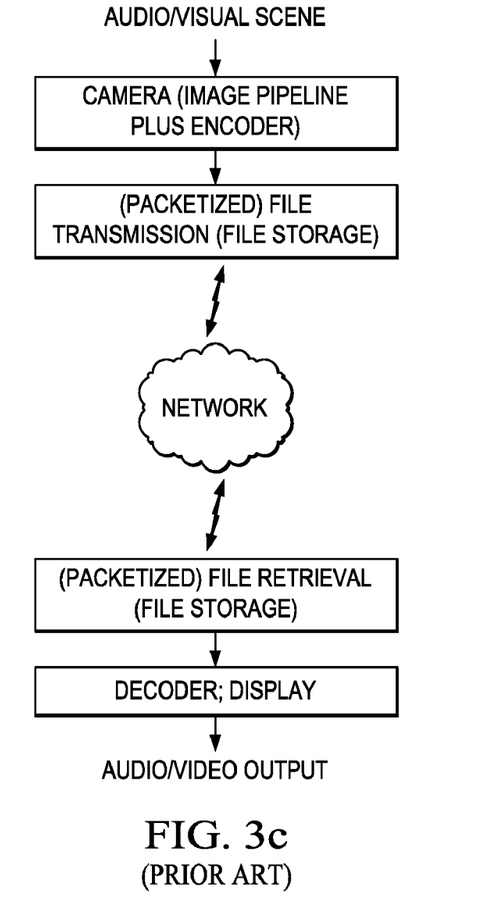

Preferred embodiment systems perform preferred embodiment methods with any of several types of hardware: digital signal processors (DSPs), general purpose programmable processors, application specific circuits, or systems on a chip (SoC) such as combinations of a DSP and a RISC processor together with various specialized programmable accelerators. FIG. 3b is an example of digital camera hardware which includes various modules such as a CCD controller (CCDC), a preview engine (PRV), image resizer (Resizer), automatic exposre, automatic focue, automatic white balance (H3A and Vfocus), image statistics (Hist), on-screen display (OSD), and so forth. A stored program in an onboard or external (flash EEP)ROM or FRAM could implement the processing of the preferred embodiment methods, or a specialzed hardware module could be used, or a combination of both. Analog-to-digital converters and digital-to-analog converters can provide coupling to the real world, modulators and demodulators (plus antennas for air interfaces) can provide coupling for transmission waveforms, and packetizers can provide formats for transmission over networks such as the Internet; see FIG. 3c.

2. Deblurring

The preferred embodiment methods use image deblurring methods to eliminate blur from an image by accurately estimating the motion blur function. Our accurate blur estimation allows us to eliminate the artifacts that are seen in FIG. 2b. Our solution is based on the following observation: The amount of blur significantly changes from image to image because hand motion is very chaotic and unpredictable. In other words, if we capture multiple images of the same scene with the exact same camera settings and under the same lighting environment, the amount of blur we get in each image would be very different. Therefore, if we had a video clip (sequence of images) of this scene, some of the video clip frames would have a lot of blur, and some others would be quite sharp. Such a video clip is usually available in today's digital cameras as a preview feature just before and after image capture; see FIG. 3b module PRV. If we monitor the video clip frames and calculate a metric of sharpness for each, we can select a video frame of the scene that is essentially free of blur. This video frame will most probably be a low resolution image such as QVGA or VGA (640×480), which are typical sizes for preview videos. Although the resolution of this video frame is low, its availability is still very valuable for the image deblurring problem as we shall explain below. When we capture the actual high-resolution megapixel image (e.g., 2500×2000), we now have two images of the same scene. The megapixel image will possibly be blurred, and our goal is to deblur it. Our method is based on estimating the blur function of this large image by utilizing the additional selected sharp video frame that we have stored.

3. Blur Function Estimation

In more detail, a preferred embodiment deblurring method proceeds with the following steps:

(1) Continuously monitor the preview video sequence of frames before and/or after the capture of the actual mega-pixel still image. For each video frame, calculate a metric for sharpness. In a buffer, keep the frame that has the highest sharpness; call this image "lowResSharp". A FIFO could hold roughly 1-2 seconds of video frames (e.g., 10-50 frames) just prior to the start of the megapixel image capture plus 1 second of video frames after megapixel image capture. Or fewer fames could be used if memory size is a constraint. The sharpness measure could be highpass filtering followed by a sum of squares method or simply a quantitative edge detection method.

(2) Capture the actual mega-pixel still image. This image will possibly be blurred; call this image "highResBlurred". Our goal is to deblur this large image.

(3) Use the lowResSharp and highResBlurred images to estimate the blur function. As a first step, align the highResBlurred image to the lowResSharp image and downsample the highResBlurred image to the size of the lowResSharp image; call this downsampled image "highResBlurredDecimated". Use the following iterative approximation method to estimate the blur function:

Initialize the initial estimate of the blur function to be a rectangle of size blurMaxSize×blurMaxSize. The parameter blurMaxSize is selected to be larger than the largest expected blur.

Starting with the upper left corner of the image, run a Least Mean Squares (LMS) adaptive filtering algorithm to update the blur estimate. At each step of the iteration, use a window of blurMaxSize×blurMaxSize pixels from the image to update the current estimate of the blur filter coefficients. Then, move the window one pixel towards the right direction and run another step of the iteration. Continue iterating until the window reaches the right edge of the image. Then, move the window to the beginning of the next line which is one pixel down. Continue iterating until the entire image has been scanned in this manner. If the blur filter coefficients have converged, stop the iteration. Convergence can be declared when the change in blur filter coefficients falls below a minimum threshold. If the iteration has not converged yet, go back to the upper left corner of the image and continue iterating. At each step of the iteration, use the following equations of the LMS algorithm to update the blur estimate:

$$e = (b - \Sigma_{1 \leq i \leq N} \Sigma_{1 \leq k \leq N} S_{ik} h_{ik}^{(m)})$$

$$h_{ik}^{(m+1)} = h_{ik}^{(m)} + \text{step} * e * S_{ik}$$

where $S_{ik}$ is the pixel value in the ith row and kth column of the current window from the lowResSharp image. $h_{ik}^{(m)}$ is the blur filter coefficient in the ith row and kth column of the blur filter at the mth step of the iteration. N is equal to blurMaxSize. b is the pixel value in the center of the window in the highResBlurredDecimated image; e is the current prediction error; and step is the step size for the adaptive filter.

(4) When the LMS method converges, we obtain the blur function estimate. First, upsample the blur function to the resolution of the highResBlurred image. This is required because we have previously downsampled the highResBlurred image to estimate the blur function. Now, use the blur function estimate to deblur the highResBlurred image. For the deblurring operation, any of the well-known image deblurring methods could be used, such as those noted in the background.

Figure 2C:
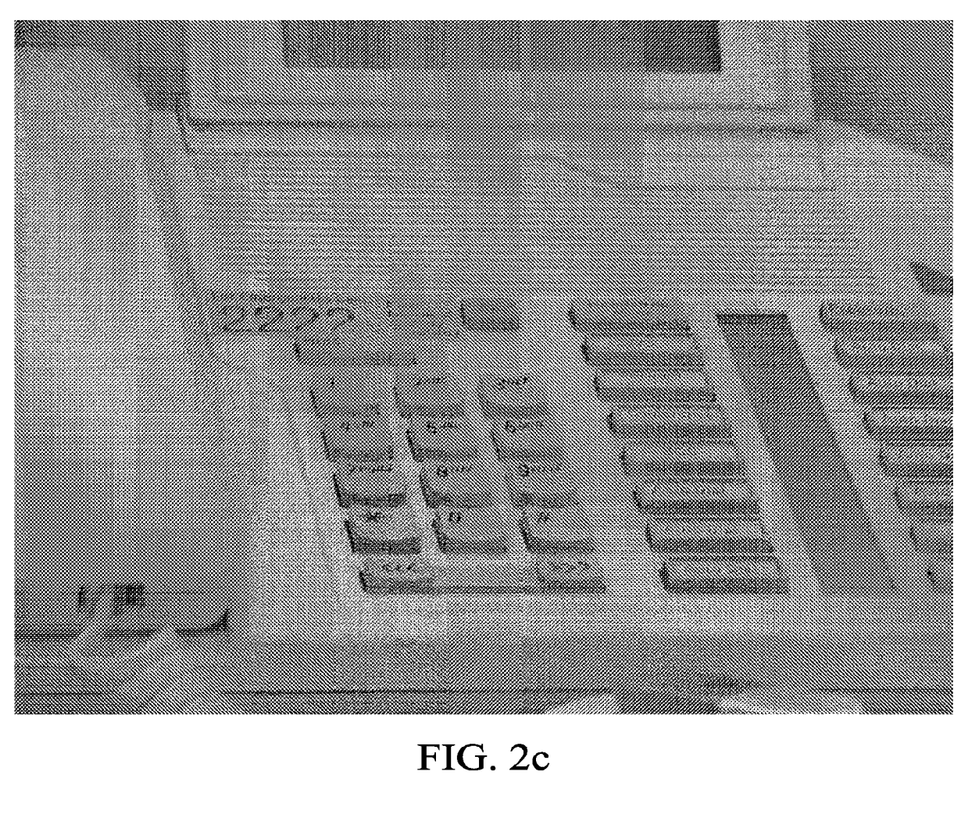

In FIG. 2c, we show the results of the preferred embodiment method. As we can see, almost all of the artifacts have been eliminated. In FIG. 1b, we show the blur function we have estimated. It is clear that the handheld motion is neither on a linear path nor has a constant speed. This is why a parametric estimation of the blur function would not provide good results.

What is claimed is:

1. An image deblurring method of a processor, comprising the steps of:
    determining in said processor the sharpest at least one of image or video frame,
    wherein said determining comprises computing a sharpness for multiple successive images or video frames;
    computing an adaptive filter for a high resolution blurred image or video frame utilizing said determined at least one of image or video frame;
    determining a blur function from the convergence of the computed adaptive filter; and
    deblurring said high resolution blurred image or video frame utilizing said blur function,
    wherein said blur function is determined by estimating said blur function using a captured image together with a selected one of said multiple successive images or video frames.

2. The method of claim 1, wherein said estimating of said blur function comprises an iterative adaptive filter convergence.

3. A digital camera, comprising:
    means for determining in a processor the sharpest at least one of image or video frame, wherein said determining comprises computing a sharpness for multiple successive images or video frames;
    means for computing an adaptive filter for a high resolution blurred image or video frame utilizing said determined at least one of image or video frame;
    means for determining a blur function from the convergence of the computed adaptive filter; and
    means for deblurring said high resolution blurred image or video frame utilizing said blur function, wherein said blur function is determined by estimating said blur function using a captured image together with a selected one of said multiple successive images or video frames.

4. The digital camera of claim 3, wherein said means for determining a blur function from the convergence of the computed adaptive filter includes an iterative adaptive filter convergence.

5. The digital camera of claim 3, wherein said digital camera is being utilized in low light environment.

* * * * *